Dec. 8, 1942.　　　　M. MANVILLE　　　　2,304,700
BEACH OR LAWN LOUNGE
Filed Nov. 25, 1940　　　2 Sheets-Sheet 2
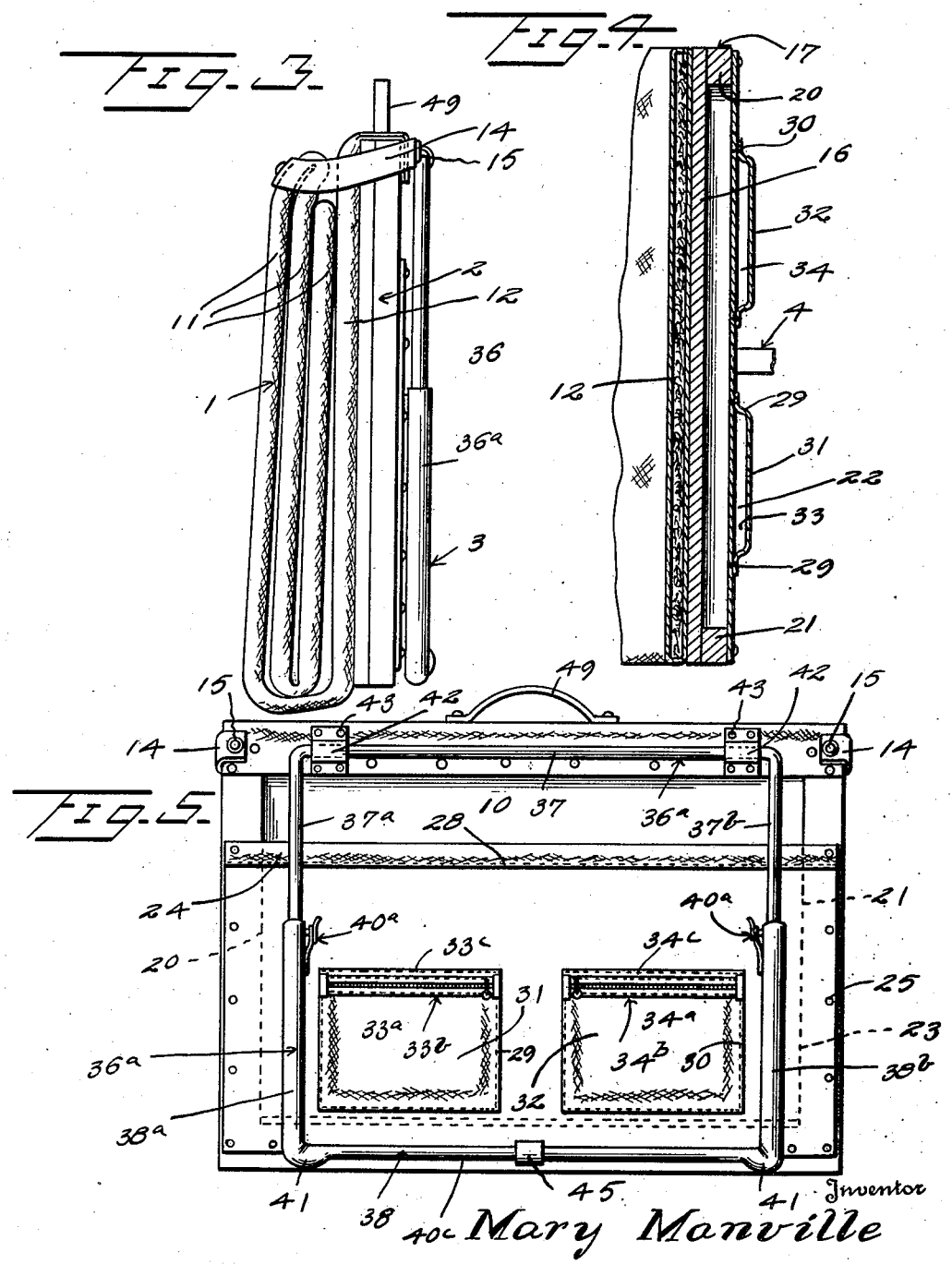

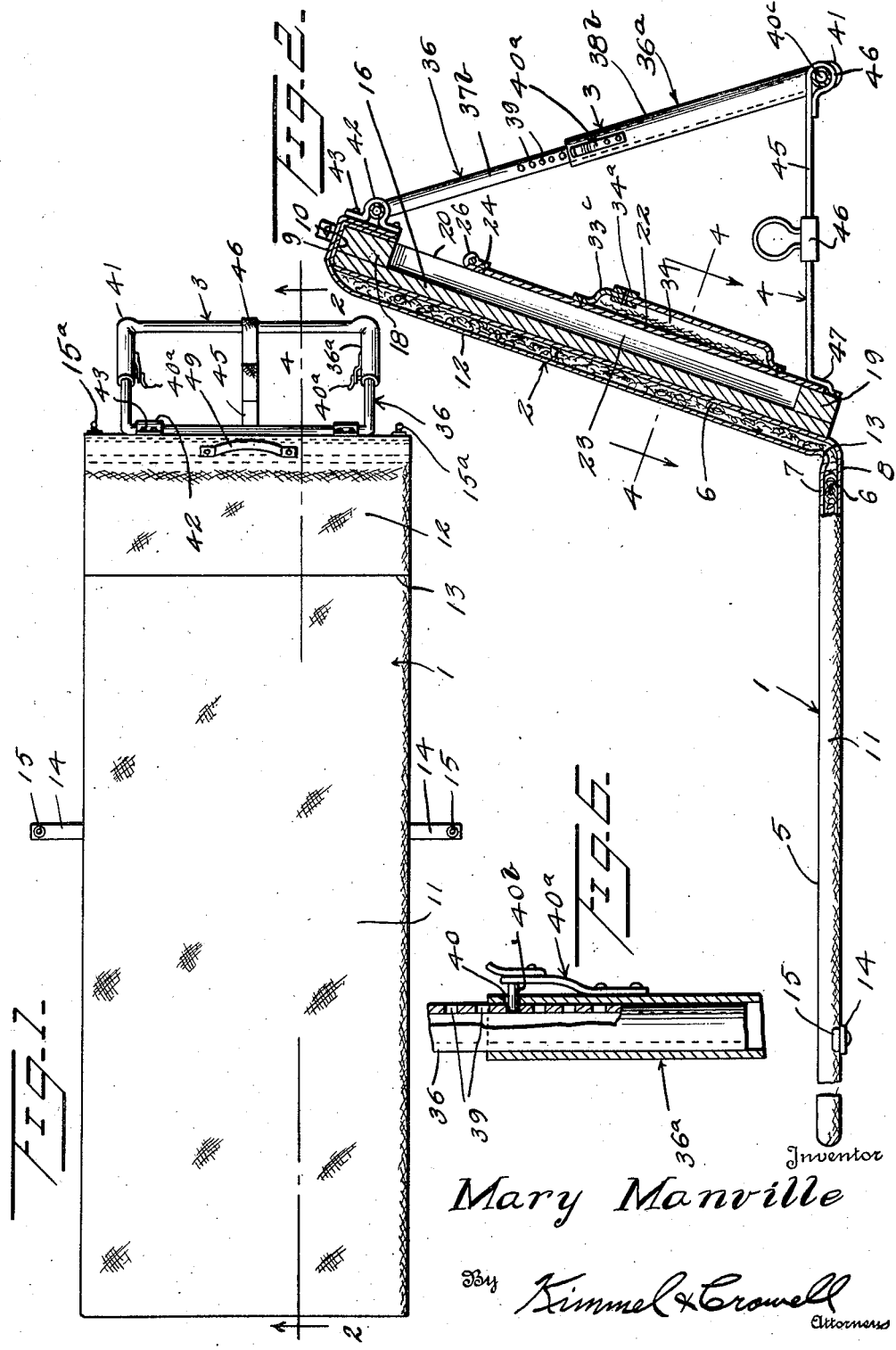

Patented Dec. 8, 1942

2,304,700

UNITED STATES PATENT OFFICE 2,304,700

BEACH OR LAWN LOUNGE

Mary Manville, Tacoma, Wash.

Application November 25, 1940, Serial No. 367,122

3 Claims. (Cl. 155—154)

This invention relates to improvements in sun, beach or lawn lounges, seats or rests and has reference more particularly to a readily portable, foldable or extendible recreation rest or device hereinafter termed a lounge rest.

The invention aims to provide, in a manner as hereinafter set forth, an article of the character referred to whereby it is possible to easily transport it from place to place over difficult terrain or long distances, which of course exemplifies its general adaptability to far more numerous situations than conventional and inferior types of cumbersome and uncomfortable folding lounges, seats and chairs.

The invention further aims to provide, in a manner as hereinafter set forth, a lounge rest which is not only compact, but is light in weight and yet sufficiently strong to withstand the wear of many seasons' severe service and the effect of intense weather conditions encountered at seashores and lawns when continually exposed to dampness, sunshine, wind and sand.

The invention further aims to provide, in a manner as hereinafter set forth, a lounge rest which when used will effectually insulate the occupant or occupants thereof from moisture, wind, cold or from danger of soiling clothing by direct contact with the ground.

The invention further aims to provide, in a manner as hereinafter set forth, a lounge rest including a supporting back and head rest portion which can be suitably adjusted by a single, simple operation and in this connection causing the supporting back and head rest portion of the lounge rest to incline to the desired degree of angularity with respect to the horizontal, and further to retain that position securely.

The invention further aims to provide, in a manner as hereinafter set forth, a lounge rest including a readily accessible compartment or compartments or pockets for the storage and safe keeping of magazines, newspapers, sun glasses, bathing suits and other desired objects, all safely protected from soiling, misplacement or loss by theft or breakage, and further immediately and conveniently accessible by the occupant or occupants of the lounge rest.

The invention further aims to provide, in a manner as hereinafter set forth, a lounge rest having its features so arranged as to be highly practicable and attractive and well within reasonable limits controlling complexity of fabrication, manufacturing costs and other requirements surrounding the commercialization of a product in accordance with this invention.

The invention further aims to provide, in a manner as hereinafter set forth, a lounge rest for the purpose referred to which is comparatively simple in its construction and arrangement, strong, durable, compact, readily assembled and comparatively inexpensive to manufacture.

Embodying the aims aforesaid and others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a top plan view of a lounge rest in accordance with this invention extended for use, Figure 2 is a section on line 2—2 Figure 1, Figure 3 is an elevation looking towards one side of the lounge rest when the latter is folded, Figure 4 is a section on line 4—4 Figure 2, Figure 5 is an elevation looking towards the outer face of the back support when the lounge rest is folded, and Figure 6 is a fragmentary view in lengthwise section and upon an enlarged scale of the lengthwise and angularly adjustable supporting element for the combined back and head rest element.

The lounge rest, in accordance with this invention and in its entirety, includes a pad element 1 of rectangular contour having the major portion of its length in one position of the lounge rest extended to a horizontal position, a combined back and head rest element 2 with which the remaining portion of the length of the pad element 1 is connected and with the element 2 capable of being adjusted to various inclinations with respect to the vertical and with respect to the inner end of the first mentioned portion of the pad element 1, an angularly adjustable supporting element 3 for the element 2, and an adjustable flexible coupling element 4 between the elements 2 and 3 to arrest the spreading of the elements 2 and 3, one with respect to the other when such elements are adjusted.

The element 1 includes a casing 5, which completely encloses a filling or stuffing 6 of any suitable material. The top and bottom walls 7, 8 of the casing 5 are extended from the inner end of the filling 6 and such extensions are indicated at 9, 10 respectively. The said extensions are disposed in abutting relation. The sides and ends of the casing 5 are closed throughout. The element 1 includes a foldable and extendible portion 11 constituting a body rest and an adjustable portion 12 for use in resting the back and head of the user. The portions 11 and 12 are hinged together, as at 13. The portion 11 is of materially greater length than the portion 12. The portion 11 of the element 1 between its transverse median and the hinge 13 is provided on its side edges with oppositely extending straps 14 formed with female fastener members 15. The purpose of the straps 14 and member 15 will be presently referred to. The portion 11 of the element 1, when the lounge rest is in use, is positioned flat upon the ground and such portion, when not in use, is capable of being folded into a compact, multi-louvered like bundle or pile, when the lounge is to be transported from place to place. The folded position of said portion 11 of element 1 is shown in Figure 3.

The portion 12 of the element 1 forms a part of the element 2 and constitutes a cushion disposed at the front of the latter. The element 2 further includes a body part 16 in the form of a rectangular panel of any suitable material, preferably wood, and throughout the front face of the panel 16 the cushion aforesaid is arranged. The element 2 also includes a frame 17, which is secured to the rear face of the body part 16. The frame 17 is formed of outer and inner members 18, 19 respectively and a pair of side members 20, 21. The said frame members are flush with the edges of the body part 16. The hinge 13 between the portions 11 and 12 of the element 1 is disposed below the lower end of body part 16 and frame member 19.

The extension 10 of the bottom wall 8 of the casing 5 is arranged against the outer edges of the body part 16 and frame member 18 and extends upon the rear face of said frame member 18. The extension 9 of the top wall of the casing 5 is positioned against and throughout the extension 10 of the bottom wall 8 of said casing 5. The said extensions 9 and 10 are secured by any suitable means to the rear face of the outer frame member 18.

The body part 16, the frame 17 and a wall forming member 22 coact to provide a storage compartment 23. The wall forming member 22 is constructed of any suitable fabric and bent rearwardly upon itself at its upper portion to form a fold 24 disposed on its rear face. The member 22 is secured against the rear face of the frame members 19, 20 and 21, as at 25. The bend 26 of the wall forming member 22 is spaced below the frame member 18 to provide an entrance for the compartment or pocket 23.

The fold 24 is secured to the body of member 22 by a stitching 28. Secured to the rear face of the wall forming member 22, below the fold 24 by the stitchings 29, 30 are spaced aligned wall forming members 31, 32 respectively, which correlate with portions of the body of the member 22 to form a pair of pockets 33, 34 respectively. Carried by the upper ends of the members 31, 32 are the lower sections 33ª, 34ª respectively of slide fastener devices 33ᵇ, 34ᵇ respectively. Secured to the rear face of member 22 above the members 31, 32 are the upper sections 33ᶜ, 34ᶜ of the devices 33ᵇ, 34ᵇ which correlate with the said sections 33ª, 34ª. The entrances of the said pockets 33, 34 are tightly closed by the devices 33ᵇ, 34ᵇ. The sections 33ᶜ, 34ᶜ are secured to member 22 by the stitchings 29, 30 respectively.

The element 3 is lengthwise adjustable and it is formed from a pair of oppositely disposed yoke-shaped members 36, 36ª. The member 36 is inverted and has its bight 37 and its arms 37ª, 37ᵇ tubular. The member 36ª is formed of a length of tubular material bent to form a bight 38 and a pair of arms 38ª, 38ᵇ. The arms of the member 36 telescope the arms of the member 36ª. Each of the arms of member 36 at the outer side of its terminal portion is formed with a row of spaced superposed spaced openings 39. Each of the arms of the member 36ª is formed near its upper end of its inner side with an opening 40 for registry with a selected opening 39. Secured to the inner side of each of the arms of the member 36ª is a resilient latching member 40ª formed with a pin 40ᵇ. The pins 40ᵇ are for extension through registering openings 39, 40 for detachably securing the element 3 in its lengthwise adjusted position. The major portion 40ᶜ of the length of the bight 38 of the member 36ª is offset upwardly from the lower ends of the said arms 38ª, 38ᵇ to provide for said portion to clear the ground and also to form a clearance for the rear portion, to be referred to, of the element 4. The points of mergence between the ends of the bight 38 and the lower ends of the arms 38ª, 38ᵇ are rounded and so arranged to form the lower end of each side of the member 36ª with what may be termed a protuberance 41 for engaging the ground to support the element 3 when the latter is in supporting position for the element 2. The bight 37 of the member 36 is positioned against the upper portion of the back of element 2. The said bight 37 is hinged to element 2 by a pair of spaced parallel coupling members 42 anchored to the element 2 by the holdfast means 43.

The element 4 consists of a flexible strap 45 of the desired length which is secured at its rear portion 46 to the portion 40ᶜ of the bight 38 of the yoke member 36ª. The said portion 46 of the strap 45 encompasses centrally the portion 40ᶜ of bight 38. The forward end terminal portion 47 of the strap 45 is secured to the rear face of the inner frame member 19 centrally of the latter. The strap 45 is provided intermediate its ends with an adjusting buckle 46 for increasing and decreasing the length of strap 45 and for maintaining the strap in its adjusted position. The strap 45, when adjusted, prevents the spreading of the elements 2, 3, one with respect to the other, when such elements are in adjusted position. The inclined positions of the element 3 provides for varying the inclination of the element 2 with respect to the vertical when the latter is disposed in upstanding relation with respect to the inner end of the portion 11 of the element 1.

The frame member 18 is formed on its rear face with a pair of spaced aligned male fastener members 15ª for correlation with the female members 15 for detachably connecting the straps 14 to the element 2 for the purpose of maintaining the portion 11 of the element 1 in folded position, such as shown in Figure 3, when the lounge rest is in folded position for transporting from place to place. When the elements of the article are in folded relation the length of the strap 45 is reduced to an extent to provide for the element 3 to be disposed in close proximity to the frame 17, as is shown in Figure 3.

The element 2 at its outer end has secured thereto a handle member 49.

In one position of use of the lounge rest, the portion 11 of the element 1 is extended, as is shown by Figure 1, and such portion is to be mounted on the ground and the element 2 disposed in upstanding relation with respect to the inner end of the portion 11 of element 1. After that the element 2 is adjusted to the desired rearward inclination from bottom to top. The element 3 is then adjusted to the desired forward inclination from bottom to top for the purpose of supporting element 2 in the position at which it has been adjusted, after which the strap 45 is adjusted to the desired length to arrest the spreading of elements 2, 3, one with respect to the other whereby such elements will be held in the position shown in Figure 2.

Another position of use of the lounge rest is that the element 2 may be disposed in horizontal relation with respect to the inner end of the portion 11 and under such conditions provide what may be termed a pallet.

The construction and relation of the parts of the article is such that it may be adjusted to provide a seat or a lounge, and is obtainable in one complete and compact portable unit.

The construction and arrangement of the lounge rest provides compactness, efficiency in speed in setting it up and taking it down and is so arranged that each element folds naturally into its proper position as the unit is unfolded, and the reverse process is semi-manually completed during the folding procedure.

What I claim is:

1. A lounge rest comprising a pad element having a foldable and extendible portion forming a body rest when extended and a non-foldable portion hinged to said other portion, an angularly adjustable combined back and head rest element located at the inner end of said foldable portion and having said non-foldable portion permanently fixed thereon and arranged throughout the front thereof to provide a cushion, said foldable portion of said rest being adapted to fold in a plurality of folds back on itself and against the front of the head rest, an angularly adjustable supporting element hinged to the rear of the combined back and head rest element for supporting the latter in its adjusted position, and a lengthwise adjustable coupling element connecting the said supporting element to the said combined back and head rest element to arrest the spreading of such elements relatively to each other from their adjusted position, said foldable portion and combined back and head rest element having coacting means for connecting said foldable portion, when foldable against the front of said back and head rest element and for releasably maintaining such folded portion folded, the coacting means of said foldable portion being bendable and extended laterally from the sides of such foldable portion intermediate their ends, the coacting means of the said combined back and head rest element being fixed to the upper portion of the back of such element at its sides.

2. A lounge rest comprising a pad element having a foldable and extendible portion forming a body rest when extended and a non-foldable portion hinged to said other portion, an angularly adjustable combined back and head rest element located at the inner end of said foldable portion and having said non-foldable portion permanently fixed thereon and arranged throughout the front thereof to provide a cushion, said foldable portion of said rest being adapted to fold in a plurality of folds back on itself and against the front of the head rest, an angularly adjustable supporting element hinged to the rear of the combined back and head rest element for supporting the latter in its adjusted position, and a lengthwise adjustable coupling element connecting the said supporting element to the said combined back and head rest element to arrest the spreading of such elements relatively to each other from their adjusted position, said foldable portion and combined back and head rest element having coacting means for connecting said foldable portion, when foldable against the front of said back and head rest element and for releasably maintaining such folded portion folded, the coacting means of said foldable portion being bendable and extended laterally from the sides of such foldable portion intermediate their ends, the coacting means of the said combined back and head rest element being fixed to the upper portion of the back of such element at its sides, said combined back and head rest forming element having means at its rear to provide storage compartments and with one of said compartments being of greater capacity than and having its entrance arranged above the others of the said compartments.

3. A lounge rest comprising a pad element having a foldable and extendible portion forming a body rest and a non-foldable portion hinged to said other portion at the inner end of the latter, an angularly adjustable combined back and head rest element located at the inner end of said foldable portion and having said non-foldable portion permanently fixed thereon and arranged throughout the front thereof to form a cushion, said foldable portion of said rest being adapted to fold in a plurality of folds back on itself and against the front of the head rest, a pair of oppositely disposed yoke-shaped members disposed in telescopic relation and coacting to form a lengthwise and angularly adjustable support for said rest element, one of said members having its bight hinged to the outer portion of the rear of said rest element, said members having coacting means for latching them together, a foldable lengthwise adjustable coupling element of strap-like form anchored at one end to the lower portion of said rest element and its other end connected to the bight of the other of said members for arresting the spreading of the rest element relative to said support, flexible members extending from the sides of said foldable portion intermediate the ends of the latter, fastener members fixed to the rear of the upper portion of said rest element, and fastener members carried by said flexible members and coacting with the fastener members on said rest element for detachably connecting said foldable portion, when folded against the non-foldable portion on the front of the rest element.

MARY MANVILLE.